(12) United States Patent
Romain

(10) Patent No.: US 10,783,091 B2
(45) Date of Patent: Sep. 22, 2020

(54) MEMORY ACCESS CONTROL AND VERIFICATION USING ADDRESS ALIASING AND MARKERS

(71) Applicant: STMICROELECTRONICS (ROUSSET) SAS, Rousset (FR)

(72) Inventor: Fabrice Romain, Rians (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 16/130,858

(22) Filed: Sep. 13, 2018

(65) Prior Publication Data
US 2019/0087355 A1    Mar. 21, 2019

(30) Foreign Application Priority Data

Sep. 15, 2017   (FR) ...................................... 17 58564

(51) Int. Cl.
*G06F 12/14*   (2006.01)
*G06F 11/00*   (2006.01)

(52) U.S. Cl.
CPC ........ *G06F 12/1458* (2013.01); *G06F 11/006* (2013.01); *G06F 12/1408* (2013.01); *G06F 2201/805* (2013.01); *G06F 2212/1052* (2013.01); *G06F 2221/2141* (2013.01)

(58) Field of Classification Search
CPC ............. G06F 12/1458; G06F 12/1408; G06F 11/006; G06F 2212/1052; G06F 2221/2141; G06F 2201/805; G06F 11/1048; G06F 3/0658; G06F 3/0622
USPC .......................... 711/210, 163; 714/768, 763
See application file for complete search history.

(56) References Cited

U.S. PATENT DOCUMENTS

| | | | |
|---|---|---|---|
| 5,148,481 A | 9/1992 | Abraham et al. | |
| 9,749,319 B2 | 8/2017 | Serebrin | |
| 2005/0154943 A1* | 7/2005 | Alexander | G11C 29/42 714/718 |
| 2007/0089032 A1* | 4/2007 | Alexander | G06F 11/1024 714/763 |
| 2008/0141268 A1* | 6/2008 | Tirumalai | G06F 9/4843 718/107 |
| 2009/0125786 A1* | 5/2009 | Alexander | G11C 29/42 714/763 |
| 2016/0321083 A1 | 11/2016 | Costa et al. | |

(Continued)

FOREIGN PATENT DOCUMENTS

EP    3457290 A1 *   3/2019   ......... G06F 12/1408

*Primary Examiner* — Hong C Kim
(74) *Attorney, Agent, or Firm* — Seed IP Law Group LLP

(57) ABSTRACT

The present disclosure concerns a memory access control system comprising: a processing device capable of operating in a plurality of operating modes, and of accessing a memory using a plurality of address aliases; and a verification circuit configured: to receive, in relation with a first read operation of a first memory location in the memory, an indication of a first of said plurality of address aliases associated with the first read operation; to verify that a current operating mode of the processing device permits the processing device to access the memory using the first address alias; to receive, during the first read operation, a first marker stored at the first memory location; and to verify, based on the first marker and on the first address alias, that the processing device is permitted to access the first memory location.

23 Claims, 3 Drawing Sheets

(56) References Cited

U.S. PATENT DOCUMENTS

2017/0286197 A1* 10/2017 Halbert ............... G06F 11/1068
2018/0203761 A1* 7/2018 Halbert ................. G11C 29/52

* cited by examiner

MEMORY ACCESS CONTROL AND VERIFICATION USING ADDRESS ALIASING AND MARKERS

BACKGROUND

Technical Field

The present disclosure relates to the field of memory access control.

Description of the Related Art

Memory access control permits the access to certain zones of a memory to be restricted based on an operating mode of a processing device wishing to access the memory. For example, a processing device may be capable of operating in a user mode and in a supervisor mode. Certain segments of the memory may be readable, writable or executable only while the processing device is operating in the supervisor mode, and other segments of the memory may be executable only while the processing device is in the user mode. Furthermore, the modification of certain core program files relating to the operating system may only be permitted while the processing device is operating in the supervisor mode.

Access control is generally achieved using an MPU (Memory Protection Unit) or MMU (Memory Management Unit). However, MPUs and MMUs have a relatively high cost in terms of logic gates (typically over 10 k gates). Indeed, prior art devices generally provide registers storing information regarding the memory access rules to be applied to each memory segment, and information identifying the start address and size of each memory segment to which the rules apply. Furthermore, prior art devices generally employ address comparators to verify, for each memory access operation, whether a restricted memory segment is being accessed. Such comparators add additional power consumption. Further still, the granularity of the memory segments is generally poor, typically of 32 bytes as a minimum, and often of 1 to 4 KB.

BRIEF SUMMARY

It would be desirable for a memory access control system to have a relatively low surface area, low power consumption and/or permitting a relatively fine granularity.

According to one aspect, there is provided a memory access control system comprising: a processing device capable of operating in a plurality of operating modes, and of accessing a memory using a plurality of address aliases; and a verification circuit configured: to receive, in relation with a first read operation of a first memory location in the memory, an indication of a first of said plurality of address aliases associated with the first read operation; to verify that a current operating mode of the processing device permits the processing device to access the memory using the first address alias; to receive, during the first read operation, a first marker stored at the first memory location; and to verify, based on the first marker and on the first address alias, that the processing device is permitted to access the first memory location.

According to one embodiment, the verification circuit is further configured to generate, in relation with a first write operation to the first memory location, the first marker and to store the first marker at the first memory location.

According to one embodiment, the verification circuit is further configured: to receive, in relation with the first write operation, an indication of an address alias of said plurality of address aliases associated with the first write operation; and to verify that a current operating mode of the processing device permits the processing device to write to the memory using said address alias associated with the first write operation.

According to one embodiment, the first marker comprises an error detection code or an error correction code.

According to one embodiment, the memory access control system further comprises an error detection code or error correction code circuit configured to verify that the first address alias matches an address alias used for a write operation of the first marker.

According to one embodiment, the memory access control system further comprises an address decoder configured to extract the first address alias from an address associated with the first read operation.

According to one embodiment, the first marker is of between 1 and 8 bits in length.

According to a further aspect, there is provided a data processing system comprising: the above memory access control system; and the memory coupled to the processing device via an address bus and a data bus.

According to yet a further aspect, there is provided a method of memory access control comprising: receiving, by a verification circuit in relation with a first read operation of a first memory location of a memory by a processing device capable of operating in a plurality of operating modes and of accessing the memory using a plurality of address aliases, an indication of a first of the plurality of address aliases associated with the first read operation; verifying that a current operating mode of the processing device permits the processing device to access the memory using the first address alias; receiving, during the first read operation, a first marker stored at the first memory location; and verifying, based on the first marker and on the first address alias, that the processing device is permitted to access the first memory location.

According to one embodiment, the method further comprises, before the first read operation, generating, in relation with a first write operation to the first memory location, the first marker and storing the first marker at the first memory location.

According to one embodiment, the method further comprises: receiving by the verification circuit in relation with the first write operation, an indication of an address alias of said plurality of address aliases associated with the first write operation; and verifying that a current operating mode of the processing device permits the processing device to write to the memory using said address alias associated with the first write operation.

According to one embodiment, the first marker comprises an error detection code or an error correction code.

According to one embodiment, the method further comprises verifying, by an error detection code or error correction code circuit, that the first address alias matches an address alias used for a write operation of the first marker.

According to one embodiment, the method further comprises extracting, by an address decoder, the first address alias from an address associated with the first read operation.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
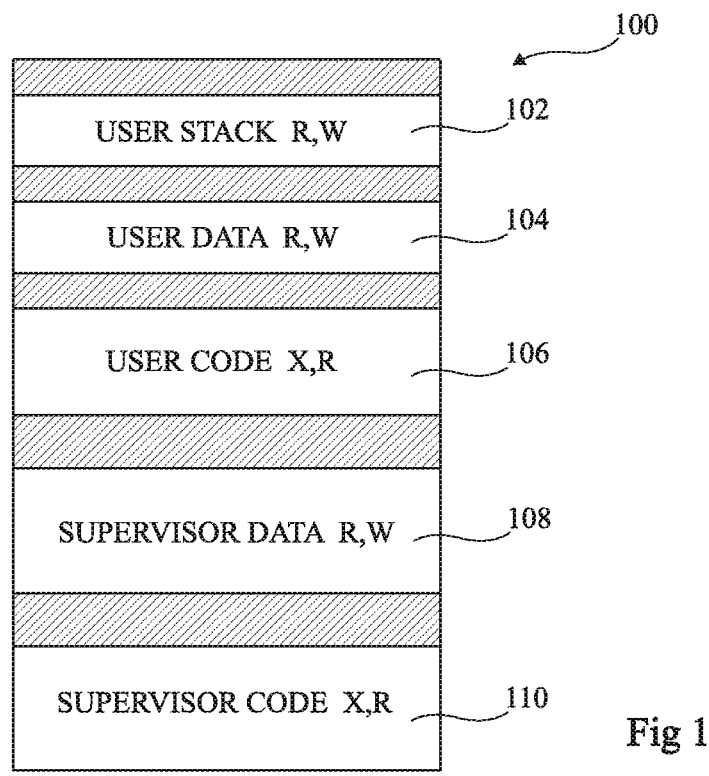
FIG. 1 schematically illustrates an example of a memory having segments with restricted access.

FIG. 1 schematically illustrates an example of a memory 100 comprising several segments having different access rights. In the example of FIG. 1, the memory comprises segments 102 and 104 respectively corresponding to a user stack (USER STACK R,W) and user data (USER DATA R,W), each of which can be accessed by read and write operations during the user operating mode, a segment 106 storing user code (USER CODE X,R), which may be executed or read during the user operating mode, and segments 108 and 110 respectively storing supervisor data (SUPERVISOR DATA R,W) and supervisor code (SUPERVISOR CODE X,R), which can only be accessed during the supervisor operating mode, the segment 108 allowing read and write operations, whereas the segment 110 allowing only execute and read operations.

Enforcing the access rules of the various memory segments of FIG. 1 could be achieved using a memory management unit (MMU) or memory protection unit (MPU), but as described above in the background section, doing so would lead to disadvantages in terms of surface area, power consumption and the granularity of the segments.

Figure 2:
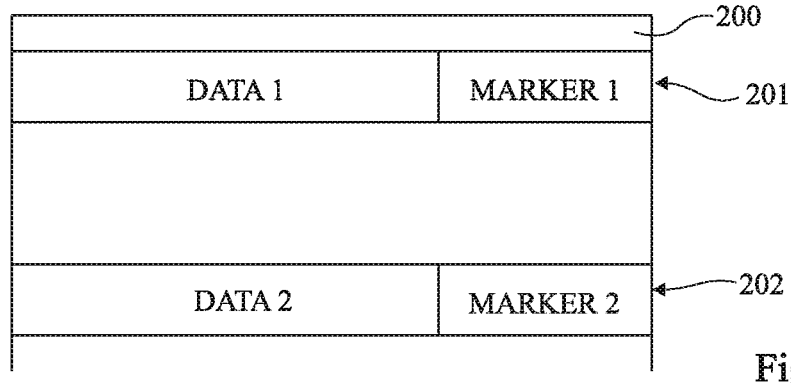
FIG. 2 schematically illustrates a memory having memory locations storing markers according to an example embodiment of the present disclosure.

FIG. 2 illustrates a memory 200 according to an example embodiment of the present disclosure. Rather than dividing a memory into address segments as described above in relation with FIG. 1, according to the embodiments described herein, each memory location of a memory can be assigned to any one of a number of different alias address zones each accessible using a corresponding address alias. Each memory location corresponds to an addressable portion of the memory. For example, the memory 200 has physical address locations corresponding to addresses 0x000 to 0xFFF, where the prefix "0x" indicates hexadecimal value. A first alias address zone in the memory is associated with an address alias "0", and can thus be accessed using the addresses 0x0000 to 0x0FFF, where the first digit 0 of hexadecimal value is the address alias. A second alias address zone in the memory is associated with an address alias "1", and can thus be accessed using the addresses 0x1000 to 0x1FFF.

Furthermore, a marker is stored at each memory location in addition to the stored data. For example, as represented in FIG. 2, a memory location 201 comprises a data value DATA1, and an associated marker MARKER1, and a memory location 202 comprises a data value DATA2 and an associated marker MARKER2. The marker indicates the address alias used during the write operation of data value stored at the corresponding memory location. In some embodiments, each marker comprises one or more bits of data directly indicating the address alias. For example, the marker is a "0" bit to represent an address alias corresponding to one alias address zone of the memory, and a "1" bit to represent another address alias corresponding to another alias address zone of the memory. In alternative embodiments described in more detail below, each marker is in the form of an EDC (Error Detection Code) or ECC (Error Correction Code) based at least partially on the address alias used during the latest write operation to the memory location.

Figure 3:
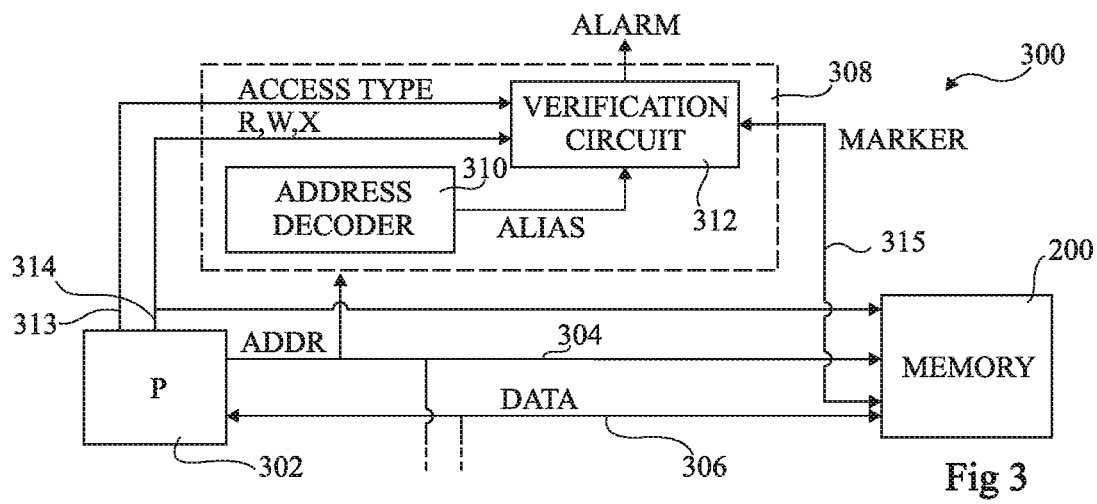
FIG. 3 schematically illustrates a data processing system comprising a memory access control circuit according to an example embodiment of the present disclosure.

FIG. 3 schematically illustrates a data processing system 300 according to example embodiment of the present disclosure.

The system 300 comprises a processing device 302 in communication with a memory 200 via an address bus 304 and a data bus 306. The memory 200 is for example a volatile memory, such as an SRAM (static random access memory) or DRAM (dynamic random access memory) or programmable non-volatile memory such as a FLASH memory or EEPROM (electronically erasable programmable read-only memory). The processing device 302 for example comprises one or more processors under control of instructions stored for example in the memory 200 and/or in a separate instruction memory. The processing device 302 is for example capable of operating in a plurality of different operating modes, such as a user mode and supervisor mode. As known to those skilled in the art, different operating modes of a processing device are for example associated with different levels of access rights in relation with reading, writing or executing data/instructions stored in a memory. A memory access control circuit 308 is provided for controlling the access to the memory 200 by the processing device 302.

The memory access control circuit 308 for example comprises an address decoder (ADDRESS DECODER) 310 and a verification circuit (VERIFICATION CIRCUIT) 312. The address decoder 310 receives one or more bits of the address provided on the address bus 304, and determines from these bits the address alias by the processing device for a current memory access operation. This information is for example provided as a signal ALIAS to the verification circuit 312. The verification circuit 312 also receives an indication of the access type according to a current operating mode of the processing device 302 on one or more lines 313, the access type being represented by one or more bits. For example, the access type could be a "user access" or a "supervisor access". The processing device also for example provides, on one or more output lines 314, an indication of the operation type, which is for example either a read R, write W or execute X operation. These one or more lines 314 are for example coupled to the verification circuit 312. Furthermore, the memory 200 also for example receives at least one of the lines 314 indicating whether the operation is a read or write operation.

In this way, the verification circuit 312 is able to verify that the access type of the processing device permits the processing device to use the address alias of the memory access operation in relation with the given operation type (read, write or execute). The verification circuit 312 also writes and reads marker values to and from the memory 200 via a bus 315.

Operation of the circuit 300 of FIG. 3 will now be described in more detail with reference to FIGS. 4 and 5.

Figure 4:
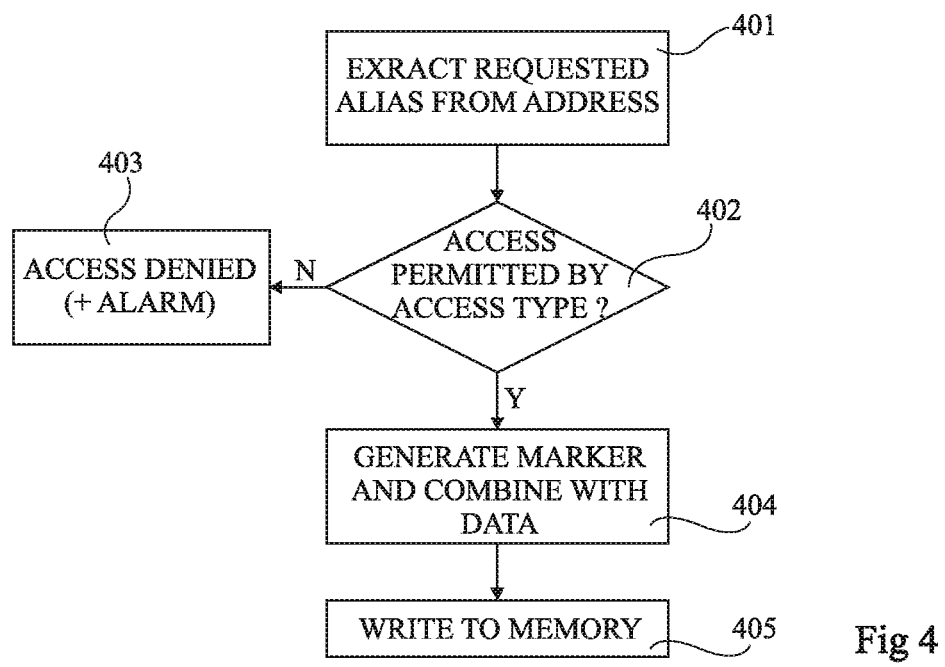
FIG. 4 is a flow diagram illustrating operations in a method of writing to a memory location using the memory access control system of FIG. 3 according to an example embodiment of the present disclosure.

FIG. 4 is a flow diagram illustrating operations in a method of writing data to a memory location in the memory 200 according to an example embodiment of the present disclosure. This method is for example implemented by the memory access control circuit 308 of FIG. 3.

In an operation 401, the address alias requested by the processing device in association with the write operation is extracted from the memory address provided by the processing device. For example, as described in relation with FIG. 3, the memory access control circuit 308 comprises an address decoder 310, which extracts the address alias from the address provided on the address bus 304. Alternatively, the address alias may be represented directly by one or more bits of the address, in which case the address decoder 310 could be omitted.

In an operation 402, it is determined whether a write access by the processing device 302 to the memory 200 using the address alias requested by the processing device is permitted in view of the current access type of the processing device. For example, the verification circuit 312 stores rules defining the access rights of the processing device 302 based on its access type. As an example, during a user mode of operation, the access type corresponds to "user access", and the rules stored by the verification circuit 312 define whether the user is authorized to access the memory using one or more address aliases for read, write or execute operations.

If it is determined that the access type of the processing device does not permit the processing device to access the memory using the requested address alias, in an operation 403, the access to the memory is for example denied, and an alarm signal may be asserted by the verification circuit 312. If, however, it is determined that access is permitted, the next operation is an operation 404.

In operation 404, a marker is generated corresponding to the address alias of the write operation requested by the processing device 302, and is combined with the data to be written to the memory. For example, as illustrated in FIG. 3, the marker of one or more bits is provided on the bus 315 from the verification circuit 312 to a data port of the memory 200, this data port being wide enough to receive the data on the data bus 306 and the marker on the bus 315.

In an operation 405, the write operation to memory 200 of the data on the data bus 306 and of the marker on the bus 315 is performed at the defined memory address. For example, the defined memory address is the physical memory address provided on the address bus 304, excluding the one or more bits of the address alias. In some embodiments the bits of the address alias are not provided to the memory 200.

Figure 5:
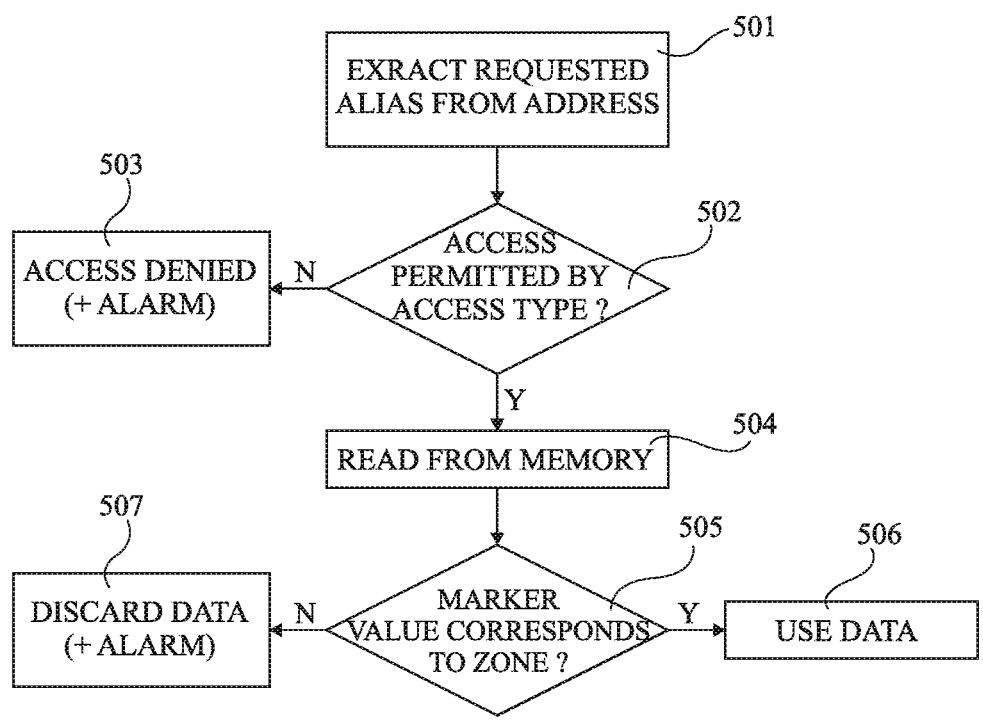
FIG. 5 is a flow diagram illustrating operations in a method of reading from a memory location using the memory access control system of FIG. 3 according to an example embodiment of the present disclosure.

FIG. 5 is a flow diagram illustrating operations in a method of reading data from a memory location and/or executing instructions stored in the memory 200 according to example embodiment of the present disclosure. This method is for example implemented by the memory access control circuit 308 of FIG. 3.

In operations 501 to 503, it is verified that the processing device has permission to make a memory access based on the requested address alias, in a similar fashion to the verification made in corresponding operations 401 to 403 of FIG. 4 described above. However, in the case of FIG. 5, the address alias relates to a read or execute operation, rather than to a write operation, and thus it is verified whether a read and/or execute operation is permitted. The address alias may be extracted from the address by the address decoder 310 as described above.

If it is determined in operation 502 that access is permitted by the current access type of the processing device 302, in an operation 504, the read or execute operation from the memory is performed, including the reading of the marker stored at the address location, the marker being provided to the verification circuit 312 on the bus 315.

In an operation 505, it is determined whether the value of the marker is compatible with the address alias now being used to access the memory. For example, the marker is provided to the verification circuit 312, which compares the marker with the address alias extracted from the address of the read or execute operation. If the marker is equal to or compatible with the address alias, then the data may be used in an operation 506 by the processing device 302. Alternatively, if the marker value does not corresponds to the address alias associated with the read or execute operation, the data is for example discarded in an operation 507, and/or the verification circuit for example asserts an alarm signal ALARM. In some embodiments, the data read from the memory 200 may be delayed for one or more cycles before being provided to the processing device 302, allowing the data to be withheld from the processing device 302 in the case that the marker value does not correspond to the address alias. Alternatively, the data may be provided to the processing device 302, but the alarm generated by the verification circuit for example causes the processing device 302 to abort a software execution of, or based on, the read data.

Figure 6:
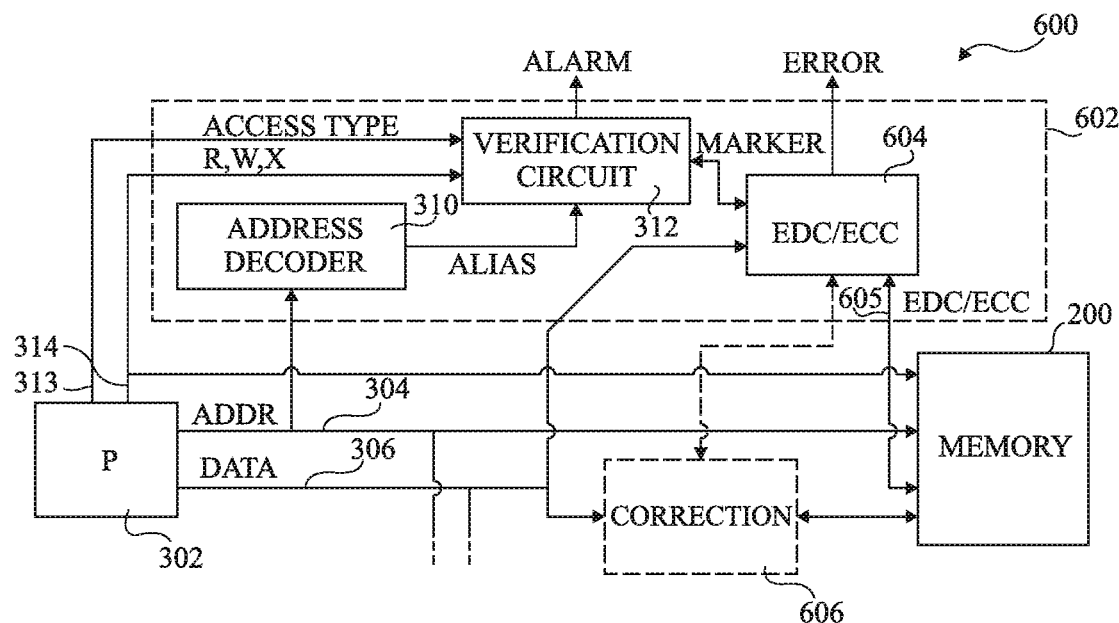
FIG. 6 schematically illustrates a data processing system comprising a memory access control circuit according to another example embodiment of the present disclosure.

FIG. 6 schematically illustrates a data processing system 600 according to an alternative embodiment to that of FIG. 3. Several features of the system 600 are similar to those of the system 300, and these features have been labelled with like reference numerals and will not be described again in detail.

The memory access control circuit 308 of FIG. 3 has been replaced in FIG. 6 by a memory access control circuit 602, which comprises the address decoder 310, the verification circuit 312 and additionally an error detection code/error correction code circuit (EDC/ECC) 604. The circuit 604 is for example capable of generating and verifying error detection code and/or error correction code based on the data present on the data bus 306 and also based on the address alias associated with the memory access operation. In particular, the EDC or ECC is provided to and from the memory 200 on a bus 605. In that case that the circuit 604 generates an ECC, a data correction circuit (CORRECTION) 606 is also for example provided for correcting, under the control of the circuit 604, the data read from the memory 202.

During a write operation to the memory 200, the address alias used by the processing device is extracted from the address, and verified against the access type, as described above in relation with operations 401 to 403 of FIG. 4. Furthermore, if the memory write access is permitted based on the access type of the processing circuit, the verification circuit 312 generates an intermediate marker based on the address alias, and provides the intermediate marker to the EDC/ECC circuit 604. The circuit 604 then for example generates an EDC and/or an ECC based on the intermediate marker and on the data value, and provides the code to the memory 200 to be written to the memory location alongside the data. Thus the EDC and/or ECC forms a new marker, which is generated based on the intermediate marker provided by the verification circuit 312 and on the data value to be stored to the memory location.

During a read operation from the memory 200, the address alias used by the processing device is extracted from the address, and verified against the access type, as described above in relation with operations 501 to 503 of FIG. 5. Furthermore, if the memory read access is permitted based on the access type of the processing circuit, the verification circuit 312 generates an intermediate marker based on the address alias provided by the address decoder, and provides the intermediate marker to the EDC/ECC circuit 604. The circuit 604 also receives the marker that was stored to the memory location in the form of an EDC and/or ECC. The circuit 604 is thus able to verify the EDC/ECC code with respect to the data read from the memory location and the intermediate marker provided by the verification circuit 312.

In the case that an error is detected by the EDC/ECC circuit 604, this indicates that either there is an error in the data value or in the EDC/ECC read from the address location, or that the original intermediate marker associated with the previous write operation to the memory location does not match the current intermediate marker associated with the read operation. In the case that the code is an EDC, the circuit 604 for example outputs an error signal ERROR, and the data value read from the memory may be discarded, or a software execution of, or based on, the data may be aborted, as described above in relation with FIG. 5. In the case that the code is an ECC, the circuit 604 for example controls the correction circuit (CORRECTION) 606 to correct any errors in the read data value. If no error was detected in the intermediate marker, the verification circuit 312 is for example informed, and the alarm signal ALARM is not asserted. If however an error is detected in the intermediate marker, the circuit 604 for example provides the corrected marker to the verification circuit 312, which for example asserts the alarm signal ALARM.

An advantage of a marker in the form of an EDC and/or ECC is that such a marker is able to provide error detection and/or correction as well as verification of the address alias without increasing the number of bits with respect to a standard EDC or ECC. Indeed, a given number of bits of an EDC or ECC generally permits a range of input bits to be protected. For example, a 6-bit ECC implemented by a Hamming code allows up to 57 bits of input data to be protected. Thus, if the data bus 306 has a width of 32 bits, the intermediate marker could be up to 25 bits without increasing the number of bits of the ECC. In practice, the intermediate marker can generally be represented by considerably fewer bits, for example comprising between 1 and 8 bits, and may simply equal the address alias.

Figure 7:
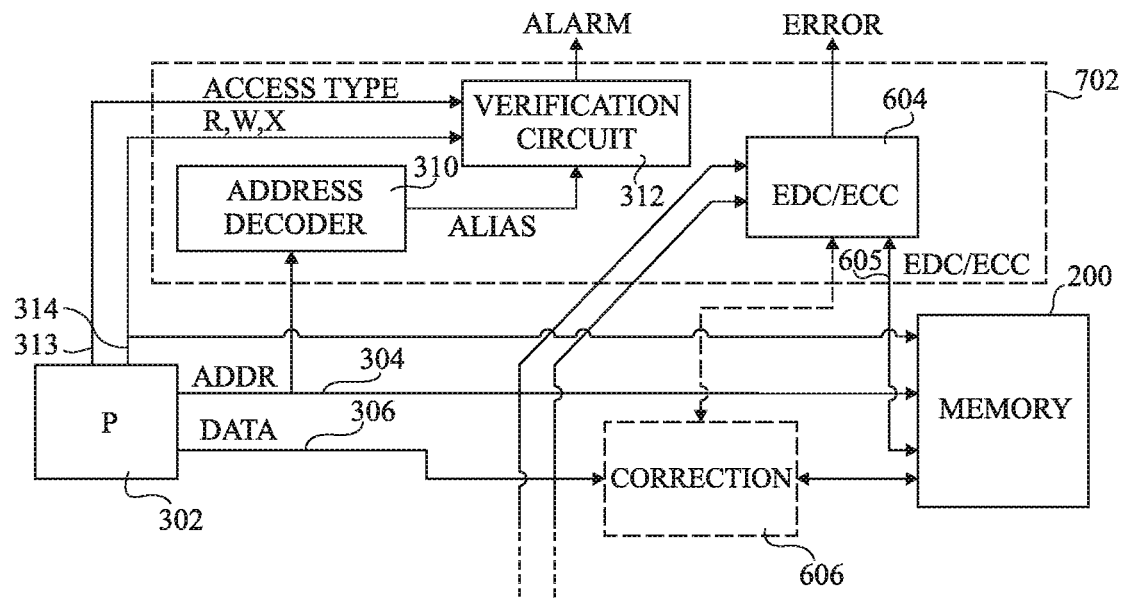
FIG. 7 schematically illustrates a data processing system comprising a memory access control system according to yet another example embodiment of the present disclosure.

FIG. 7 schematically illustrates a data processing system 700 according to yet another example embodiment of the present disclosure. The system 700 has many features in common with the embodiment of FIG. 6, and these features have been labelled with like reference numerals and will not be described again in detail.

In the embodiment of FIG. 7, the verification circuit 312 only verifies whether access is permitted using the requested address alias based on the current access type of processing device, as described in relation with operations 401 to 403 of FIG. 4 and operations 501 to 503 of FIG. 5. The EDC/ECC circuit 604 for example receives the address, including the address alias, directly from the address bus 304, and generates the corresponding intermediate marker based on at least part of the address containing the address alias. The intermediate marker can then be taken into account when generating the EDC/ECC during a write operation, or used to verify the EDC/ECC during a read operation.

In alternative embodiments to the one of FIG. 7, rather than receiving the address data from the address bus 304, the EDC/ECC circuit 604 could receive the signal ALIAS from the address decoder 310, and generate or verify the intermediate marker based on this address alias.

An advantage of the embodiments described herein is that, by defining address aliases that can be used by the processing device 302 to access a memory, and also storing a marker in the memory locations of a memory, access control can be implemented in a simple fashion and without the need of an MPU or MMU. Furthermore, the granularity of the individual alias address zones can be very small, equal for example to the word size.

Having thus described at least one illustrative embodiment, various alterations, modifications and improvements will readily occur to those skilled in the art. For example, it will be apparent to those skilled in the art that the memory access control circuits 308, 602 and 702 described herein represent only some example implementations, and that various alternatives would be possible. For example, the address alias could be extracted without an address decoder if for example the address alias is indicated simply by one or more bits of the address, and either the verification circuit 312 or the EDC/ECC circuit 604 in FIG. 6 could be responsible for generating a warning signal based on the verification of the marker.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A memory access control system comprising:
 a processing device configured to operate in a plurality of operating modes and access a memory using a plurality of address aliases; and
 a verification circuit configured to:
  receive, in relation with a first read operation of a first memory location in the memory, an indication of a first of said plurality of address aliases associated with the first read operation;
  verify that a current operating mode of the processing device permits the processing device to access the memory using the first address alias;
  receive, during the first read operation, a first marker stored at the first memory location; and
  verify, based on the first marker and on the first address alias, that the processing device is permitted to access the first memory location.

2. The memory access control system of claim 1, wherein the verification circuit is further configured to generate, in relation with a first write operation to the first memory location, the first marker and to store the first marker at the first memory location.

3. The memory access control system of claim 2, wherein the verification circuit is further configured to:

receive, in relation with the first write operation, an indication of an address alias of said plurality of address aliases associated with the first write operation; and verify whether a current operating mode of the processing device permits the processing device to write to the memory using said address alias associated with the first write operation.

4. The memory access control system of claim 1, wherein the first marker comprises an error detection code or an error correction code.

5. The memory access control system of claim 4, further comprising an error detection code or error correction code circuit configured to verify that the first address alias matches an address alias used for a write operation of the first marker.

6. The memory access control system of claim 1, further comprising an address decoder configured to extract the first address alias from an address associated with the first read operation.

7. The memory access control system of claim 1, wherein the first marker is of between 1 and 8 bits in length.

8. The memory access control system of claim 1, wherein to verify that the processing device is permitted to access the first memory location includes to permit access of the first read operation to the first memory location responsive to a determination, based at least in part on the first marker, that the first address alias matches a second address alias associated with a previous first write operation to the first memory location, and to otherwise prevent access to the first memory location by the first read operation.

9. A data processing system comprising:
a memory;
an address bus and a data bus; and
a memory access control system that includes:
a processing device configured to operate in a plurality of operating modes and access a memory using a plurality of address aliases; and
a verification circuit configured to:
receive, in relation with a first read operation of a first memory location in the memory, an indication of a first of said plurality of address aliases associated with the first read operation;
verify that a current operating mode of the processing device permits the processing device to access the memory using the first address alias;
receive, during the first read operation, a first marker stored at the first memory location; and
verify, based on the first marker and on the first address alias, whether the processing device is permitted to access the first memory location.

10. The data processing system of claim 9, wherein the verification circuit is further configured to generate, in relation with a first write operation to the first memory location, the first marker and to store the first marker at the first memory location.

11. The data processing system of claim 10, wherein the verification circuit is further configured to:
receive, in relation with the first write operation, an indication of an address alias of said plurality of address aliases associated with the first write operation; and
verify that a current operating mode of the processing device permits the processing device to write to the memory using said address alias associated with the first write operation.

12. The data processing system of claim 9, wherein the first marker comprises an error detection code or an error correction code.

13. The data processing system of claim 12, wherein the memory access control system includes an error detection code or error correction code circuit configured to verify that the first address alias matches an address alias used for a write operation of the first marker.

14. The data processing system of claim 9, wherein the memory access control system includes an address decoder configured to extract the first address alias from an address associated with the first read operation.

15. The data processing system of claim 9, wherein the first marker is of between 1 and 8 bits in length.

16. The data processing system of claim 9, wherein to verify whether the processing device is permitted to access the first memory location based on the first marker and on the first address alias includes to permit access of the first read operation to the first memory location responsive to a determination, based at least in part on the first marker, that the first address alias matches a second address alias associated with a previous write operation to the first memory location, and otherwise prevent access to the first memory location by the first read operation.

17. A method of memory access control comprising:
receiving, by a verification circuit of a processing device configured to operate in a plurality of operating modes and access a memory using a plurality of address aliases, an indication of a first address alias, of the plurality of address aliases, associated with a first read operation of a first memory location of the memory by the processing device;
verifying that a current operating mode of the processing device permits the processing device to access the memory using the first address alias;
receiving, during the first read operation, a first marker stored at the first memory location; and
verifying, based on the first marker and on the first address alias, whether the processing device is permitted to access the first memory location.

18. The method of claim 17, further comprising, before the first read operation, generating, in relation with a first write operation to the first memory location, the first marker and storing the first marker at the first memory location.

19. The method of claim 18, further comprising:
receiving by the verification circuit in relation with the first write operation, an indication of an address alias of said plurality of address aliases associated with the first write operation; and
verifying that a current operating mode of the processing device permits the processing device to write to the memory using said address alias associated with the first write operation.

20. The method of claim 17, wherein the first marker comprises an error detection code or an error correction code.

21. The method of claim 20, further comprising verifying, by an error detection code or error correction code circuit, that the first address alias matches an address alias used for a write operation of the first marker.

22. The method of claim 17, further comprising extracting, by an address decoder, the first address alias from an address associated with the first read operation.

23. The method of claim 17, wherein verifying whether the processing device is permitted to access the first memory location based on the first marker and on the first address alias includes permitting access of the first read operation to the first memory location responsive to verifying, based on the first marker, that the first address alias matches a second address alias associated with a previous write operation to the first memory location, and otherwise preventing access to the first memory location by the first read operation.

* * * * *